(12) United States Patent
Army et al.

(10) Patent No.: US 10,962,294 B2
(45) Date of Patent: Mar. 30, 2021

(54) DUAL PASS HEAT EXCHANGER WITH DRAIN SYSTEM

(71) Applicant: Hamilton Sundstrand Corporation, Charlotte, NC (US)

(72) Inventors: Donald E. Army, Enfield, CT (US); Frederick Peacos, III, North Scituate, RI (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 325 days.

(21) Appl. No.: 16/213,217

(22) Filed: Dec. 7, 2018

(65) Prior Publication Data

US 2020/0182550 A1   Jun. 11, 2020

(51) Int. Cl.
*F28D 7/16* (2006.01)
*F28F 1/10* (2006.01)
(Continued)

(52) U.S. Cl.
CPC ......... *F28D 7/1653* (2013.01); *F28D 9/0093* (2013.01); *F28F 1/10* (2013.01); *F28F 9/26* (2013.01); *B64D 13/06* (2013.01)

(58) Field of Classification Search
CPC .... F28D 9/0093; F28D 9/0068; F28D 9/0062; F28D 9/268; F28D 9/0056; F28D 2021/0021; F28D 7/1653; F28F 17/005; F28F 1/10; F24F 12/006; B64D 13/06; B64D 13/08; B64D 2013/0618
See application file for complete search history.

(56) References Cited

U.S. PATENT DOCUMENTS 4,374,469 A * 2/1983 Rannenberg ........... B64D 13/06
                                                        62/172
5,180,004 A * 1/1993 Nguyen ............... B60H 1/3227
                                                        165/135
(Continued)

FOREIGN PATENT DOCUMENTS

DE   102004039667 A1   3/2006
EP       0865598 B1   2/2003
(Continued)

OTHER PUBLICATIONS

Extended European Search Report for EP Application No. 19214384.0, dated Apr. 28, 2020, 8 pages.

*Primary Examiner* — Joel M Attey
*Assistant Examiner* — For K Ling
(74) *Attorney, Agent, or Firm* — Kinney & Lange, P.A.

(57) ABSTRACT

A heat exchanger assembly for an aircraft with an environmental control system includes first and second heat exchangers, a closure bar, and a drain manifold. The first heat exchanger is in fluid communication with a source of bleed air from the aircraft. The second heat exchanger has a second hot air circuit passing through the second heat exchanger and is disposed adjacent to and in fluid communication with the first heat exchanger. The closure bar is disposed between the first and second heat exchangers such that the closure bar prevents fluid communication across the closure bar between the first and second heat exchangers. The drain manifold is mounted to a sidewall of the heat exchanger assembly. A channel of the drain manifold is in fluid communication with a surface of the closure bar.

14 Claims, 4 Drawing Sheets

(51) Int. Cl.
*F28F 9/26* (2006.01)
*F28D 9/00* (2006.01)
*B64D 13/06* (2006.01)

(56) References Cited

U.S. PATENT DOCUMENTS

| | | | | |
|---|---|---|---|---|
| 5,321,954 | A | * | 6/1994 | Lehman ............... F25J 3/04878 62/643 |
| 6,189,338 | B1 | * | 2/2001 | Lehman ............... B01D 5/0015 165/111 |
| 6,460,353 | B2 | | 10/2002 | Udobot et al. |
| 7,762,090 | B2 | * | 7/2010 | Lee ..................... B01D 5/0072 62/93 |
| 8,579,015 | B2 | | 11/2013 | Stark |
| 8,601,826 | B2 | | 12/2013 | Army et al. |
| 9,453,692 | B2 | | 9/2016 | Fijas et al. |
| 9,644,643 | B2 | | 5/2017 | Bizzarro |
| 9,810,489 | B2 | * | 11/2017 | Shigemori ............ F28D 9/0037 |
| 2005/0061911 | A1 | * | 3/2005 | Zywiak .................. F24F 13/04 244/53 R |
| 2006/0196216 | A1 | * | 9/2006 | Bruno .................... B64D 13/06 62/402 |
| 2007/0004326 | A1 | * | 1/2007 | Haas ...................... B64D 13/06 454/71 |
| 2011/0289943 | A1 | | 12/2011 | Raifsnider |
| 2013/0139531 | A1 | | 6/2013 | Pohl et al. |
| 2015/0323216 | A1 | * | 11/2015 | Wallin .................... F28D 5/00 62/314 |

FOREIGN PATENT DOCUMENTS

| | | |
|---|---|---|
| EP | 1329380 A1 | 7/2003 |
| EP | 3517875 A1 | 7/2019 |
| GB | 606890 | 8/1948 |
| WO | WO93/18360 A1 | 9/1993 |

* cited by examiner

DUAL PASS HEAT EXCHANGER WITH DRAIN SYSTEM

BACKGROUND

The present disclosure generally relates to heat exchangers. In particular, the present disclosure relates to drainage features of heat exchanger cores.

An environmental control system ("ECS") aboard an aircraft provides conditioned air to the aircraft cabin. Conditioned air is air at a desired temperature, pressure, and humidity for aircraft passenger comfort. Compressing ambient air at flight altitude heats the resulting pressurized air sufficiently that it must be cooled, even if the ambient air temperature is very low. Thus, under most conditions, heat must be removed from air by the ECS before the air is delivered to the aircraft cabin. As heat is removed from the air, it is dissipated by the ECS into a separate stream of air that flows into the ECS, across heat exchangers in the ECS, and out of the aircraft, carrying the excess heat with it.

In existing heat exchanger assemblies with more than one heat exchanger core, moisture entrained in the bleed air can condense and become trapped in fins of the bleed circuit. This presents risks of freezing of pooled water within the heat exchanger core and obstructing the airflow due to the pooled water.

SUMMARY

A heat exchanger assembly for an aircraft with an environmental control system includes first and second heat exchangers, a closure bar, and a drain manifold. The first heat exchanger is in fluid communication with a source of bleed air from the aircraft. The second heat exchanger has a second hot air circuit passing through the second heat exchanger and is disposed adjacent to and in fluid communication with the first heat exchanger. The closure bar is disposed between the first and second heat exchangers such that the closure bar prevents fluid communication across the closure bar between the first and second heat exchangers. The drain manifold is mounted to a sidewall of the heat exchanger assembly. A channel of the drain manifold is in fluid communication with a surface of the closure bar.

A method of managing water in a heat exchanger assembly of an aircraft includes passing hot air of a first hot air circuit through hot layers of a first heat exchanger of a heat exchanger assembly. The heat exchanger assembly includes first and second heat exchangers, a closure bar, and a spray nozzle. The first heat exchanger is in fluid communication with a source of bleed air from the aircraft. The second heat exchanger has a second hot air circuit passing therethrough and is disposed adjacent to and in fluid communication with the first heat exchanger. The closure bar is disposed between the first and second heat exchangers such that the closure bar prevents fluid communication across the closure bar between the first and second heat exchangers. The drain manifold is mounted to a sidewall of the heat exchanger assembly. A channel of the drain manifold is in fluid communication with a surface of the closure bar. Moisture deposited onto the closure bar is drained through an opening in the sidewall of the heat exchanger assembly and into the channel of the drain manifold. The moisture is then emitted from the channel of the drain manifold out of the drain manifold through the spray nozzle.

The present summary is provided only by way of example, and not limitation. Other aspects of the present disclosure will be appreciated in view of the entirety of the present disclosure, including the entire text, claims, and accompanying figures.

Figure 1:
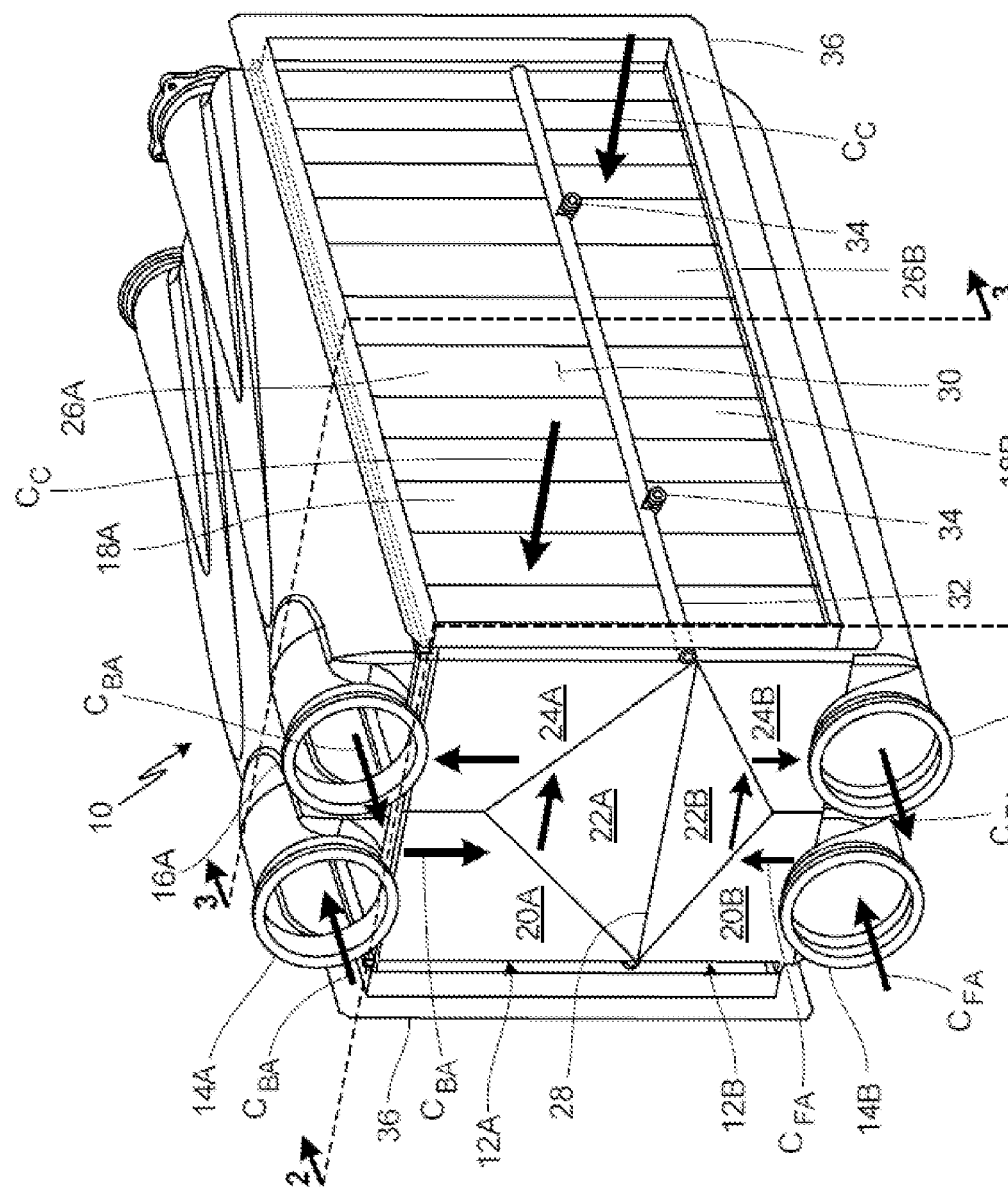
FIG. 1 is a perspective view of the heat exchanger assembly.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

In a heat exchanger assembly, drain slots are provided in a bleed air tent fin (via electrical discharge machining) along with a water drain passage for each hot fin layer for draining moisture into a common drain manifold attached to the cold ram inlet face. Outlet nozzles are mounted onto the drain manifold to spray the water into the ram inlet where additional evaporative cooling can be realized during operation. For a discussion of an exemplary heat exchanger assembly, see U.S. patent application Ser. No. 15/879,234 entitled "ENVIRONMENTAL CONTROL SYSTEM TRI-HEAT EXCHANGER" filed on Jan. 1, 2018, which is herein incorporated by reference in its entirety.

FIG. 1 is a perspective view of heat exchanger assembly 10 and shows heat exchanger 12A (with inlet 14A, outlet 16A, and hot layers 18A (including first fin section 20A, tent fin section 22A, and second fin section 24A), and cold layers 26A), heat exchanger 12B (with inlet 14B, outlet 16B, and hot layers 18B (including first fin section 20B, tent fin section 22B, and second fin section 24B), and cold layers 26B), closure bar 28, sidewall 30, drain manifold 32, spray nozzles 34, mounting flanges 36, bleed air circuit $C_{BA}$, fresh air circuit $C_{FA}$, and cold air circuit $C_C$.

Heat exchanger assembly 10 is an assembly of two heat exchangers, heat exchangers 12A and 12B. In this example, heat exchanger assembly 10 is part of an ECS for an aircraft (not shown). Heat exchangers 12A and 12B are heat exchangers each with a plurality of fins for transferring thermal energy between the fins and a fluid. In this example, heat exchanger 12A is a bleed air heat exchanger and heat exchanger 12B is a fresh air heat exchanger. Inlets 14A and 14B and outlets 16A and 16B are fluidic openings. Hot layers 18A and 18B are single cross-section layers of heat exchangers 12A and 12B, respectively. Hot layers 18A and 18B include heat exchanging fins formed as patterned ridges or contours of solid material (see, e.g., FIG. 2) such as metal configured to transfer thermal energy between the fins and a fluid passing across the fins. First fin sections 20A and 20B, tent fin sections 22A and 22B, and second fin sections 24A and 24B are different sections of heat exchanging fins.

Cold layers 26A and 26B are single cross-section layers of heat exchangers 12A and 12B, respectively. Cold layers 26A and 26B include heat exchanging fins that are wavy sheets of solid material such as metal configured to transfer thermal energy between the heat exchanging fins and a fluid passing across cold the heat exchanging fins. In this example, cold layers 26A and 26B make up a single heat exchanger layer, as opposed to fluidly distinct portions as shown by hot layers 18A and 18B that area separated by closure bar 28.

Closure bar 28 is a flat piece of solid material. Sidewall 30 is a flat piece of solid material on a side of heat exchanger assembly 10. Drain manifold 32 is a portion of a tube. In this non-limiting embodiment, drain manifold 32 is approximately semi-circular in cross-section shape and is generally linear along a longitudinal axis of drain manifold 32. In other examples, drain manifold 32 can include a curved, angled, tapered, and/or bent shape to allow for fluid to drain towards the ends of drain manifold 32. In another embodiment, drain manifold 32 can include drain holes near or at the ends of drain manifold 32 for draining any residual moisture from drain manifold 32. Spray nozzles 34 are plugs with orifices extending therethrough to create a fluidic spout. Mounting flanges 36 are flanges for attaching heat exchanger assembly 10 to other components of the ECS and/or aircraft. In this example, mounting flanges 36 are picture frame flanges. Bleed air circuit $C_{BA}$, fresh air circuit $C_{FA}$, and cold air circuit $C_C$ are fluidic pathways. In this example, a point of entry of cold air circuit $C_C$ into heat exchanger assembly 10 is a RAM inlet of heat exchanger 10.

Heat exchanger assembly 10 is disposed in and as a component of the ECS of the aircraft. Heat exchangers 12A and 12B are mounted together in a parallel configuration. Heat exchanger 12A is fluidly connected to hot layer 18A and to a source of bleed air of the aircraft via inlet 14A. Similarly, heat exchanger 12B is fluidly connected to hot layer 18B and to a source of fresh air of the aircraft via inlet 14B. Inlet 14A is located in a top portion (top/upward as shown in FIG. 1) of heat exchanger 12A and is fluidly connected to first fin section 20A of hot layer 18A. Inlet 14B is located in a bottom portion (bottom/downward as shown in FIG. 1) of heat exchanger 12B and is fluidly connected to first fin section 20B of hot layer 18B.

Outlet 16A is disposed on an upper portion of heat exchanger 12A and is fluidly connected to second fin section 24A of hot layer 18A. Outlet 16B is disposed on a lower portion of heat exchanger 12B and is fluidly connected to second fin section 24B of hot layer 18B. Hot layers 18A and 18B are disposed inside of heat exchanger assembly 10 and are positioned in an alternating arrangement (e.g., every-other pattern) with cold layers 26A and 26B. First fin section 20A is fluidly connected to inlet 14A and to tent fin section 22A. Along a flowpath of bleed air circuit $C_{BA}$, first fin section 20A is downstream of inlet 14A. First fin section 20B is fluidly connected to inlet 14B and to tent fin section 20B. First fin section 20B is situated downstream of inlet 14B along a flowpath of bleed air circuit $C_{FA}$.

Tent fin section 22A is fluidly connected to first fin section 20A and to second fin section 24A. Tent fin section 22A is located at a gravitational bottom of hot layer 18A (bottom/downward direction as shown in FIG. 1). Along a flowpath of bleed air circuit $C_{BA}$, tent fin section 22A is downstream of first fin section 20A. Tent fin section 22B is fluidly connected to first fin section 20B and to second fin section 24B. Tent fin section 22B is located at a gravitational top of hot layer 18B (top/upward direction as shown in FIG. 1). Along a flowpath of fresh air circuit $C_{FA}$, tent fin section 22B is downstream of first fin section 20B. Tent fin sections 22A and 22B are separated by closure bar 28. Second fin section 24A is fluidly connected to tent fin section 22A and to outlet 16A. Along a flowpath of bleed air circuit $C_{BA}$, second fin section 24A is downstream of tent fin section 22A. Second fin section 24B is fluidly connected to tent fin section 22B and to outlet 16B. Along a flowpath of fresh air circuit $C_{FA}$, second fin section 24B is downstream of tent fin section 22B.

Cold layers 26A and 26B are positioned between hot layers 18A and 18B, respectively in an alternating configuration. Closure bar 28 is positioned between hot layer 18A of heat exchanger 12A and hot layer 18B of heat exchanger 12B. Sidewall 30 is positioned along a side of heat exchanger assembly 10. Drain manifold 32 is mounted to sidewall 30 of heat exchanger assembly 10 at a vertical location of closure bar 28. Drain manifold 32 is in fluid communication with an upper surface of closure bar 28 and with an interface between tent fin section 22A and second fin section 24A. Spray nozzles 34 are mounted to drain manifold 32 and are fluidly connected to a channel disposed within drain manifold 32. Mounting flanges 36 are mounted to portions of the sidewalls (e.g., sidewall 30) of heat exchanger assembly 10.

Bleed air circuit $C_{BA}$ is located in and passes through hot layers 18A of heat exchanger 12A. For example, bleed air circuit $C_{BA}$ flows into heat exchanger 12A through inlet 14A, down into first fin section 20A, transfers from first fin section 20A to tent fin section 22A, transfers from tent fin section 22A to second fin section 24A, transfers into and through outlet 16A, and out of heat exchanger 12A. In this example, a bottom of tent fin section 22A is disposed along a gravitational bottom of hot layer 18A (bottom/downward direction as shown in FIG. 1). Fresh air circuit $C_{FA}$ is located in and passes through hot layers 18B of heat exchanger 12B. For example, fresh air circuit $C_{FA}$ flows into heat exchanger 12B through inlet 14B, up into first fin section 20B, transfers from first fin section 20B to tent fin section 22B, transfers from tent fin section 22B to second fin section 24B, transfers into and through outlet 16B, and out of heat exchanger 12B. Cold air circuit $C_C$ is located in and passes through cold layers 26A and 26B of heat exchangers 12A and 12B, respectively.

Heat exchangers 12A and 12B of heat exchanger assembly 10 transfer thermal energy (via hot layers 18A and 18B and cold layers 26A and 26B) between bleed air circuit $C_{BA}$, fresh air circuit $C_{FA}$, and cold air circuit $C_C$ in order to provide conditioned air to the ECS of the aircraft. Inlets 14A and 14B deliver the airflows of bleed air circuit $C_{BA}$ and fresh air circuit $C_{FA}$ into heat exchangers 12A and 12B, respectively. Outlets 16A and 16B deliver the airflows of bleed air circuit $C_{BA}$ and fresh air circuit $C_{FA}$ out of heat exchangers 12A and 12B, respectively. First fin sections 20A and 20B transfer bleed air circuit $C_{BA}$ and fresh air circuit $C_{FA}$, respectively into tent fin sections 22A and 22B, respectively. Tent fin sections 22A and 22B transfer bleed air circuit $C_{BA}$ and fresh air circuit $C_{FA}$, respectively into second fin sections 24A and 24B, respectively. Second fin sections 24A and 24B transfer bleed air circuit $C_{BA}$ and fresh air circuit $C_{FA}$, respectively to outlets 16A and 16B respectively.

Closure bar 28 fluidly separates bleed air circuit $C_{BA}$ of hot layer 18A from fresh air circuit $C_{FA}$ of hot layer 18B. Closure bar 28 also collects moisture from bleed air circuit $C_{BA}$ as the moisture from bleed air circuit $C_{BA}$ condenses onto a top surface of closure bar 28. During operation, the moisture deposited onto the top surface of closure bar 28 runs off of closure bar 28 and into an internal channel of drain manifold 32. Once the moisture drains into the channel of drain manifold 32, the moisture is then output from drain manifold 32 through spray nozzles 34 and into cold air circuit $C_C$ as cold air circuit $C_C$ enters into heat exchanger assembly 10.

Sidewall 30 simultaneously forms an external boundary of hot layers 18A and 18B, and a mounting surface for drain manifold 32. Drain manifold 32 provides a receptacle and delivery channel for moisture to be collected from hot layers 18A and to deliver that collected moisture to spray nozzles 34 to be output from hot layers 18A. Spray nozzles 34 emit the moisture received from hot layers 18A (via drain manifold 32) and spray the moisture back into cold air circuit $C_C$ to provide for additional evaporative cooling as cold air circuit $C_C$ enters into heat exchanger assembly 10. For example, moisture is driven out of spray nozzles 34 due to a pressure differential between bleed air circuit $C_{BA}$ and ambient air. Mounting flanges 36 provide interfaces with which additional ECS components attach to.

Bleed air circuit $C_{BA}$ is sent through hot layer 18A and in so doing, transfers thermal energy to cold air circuit $C_C$ via the fins of hot layer 18A and the fins of cold layer 26A. Fresh air circuit $C_{FA}$ is sent through hot layer 18B and in so doing, transfers thermal energy to cold air circuit $C_C$ via the fins of hot layer 18B and the fins of cold layer 26B. Cold air circuit $C_C$ is sent through cold layers 26A and 26B in order to receive thermal energy from bleed air circuit $C_{BA}$ and fresh air circuit $C_{FA}$.

Use of drain manifold 32 with heat exchanger assembly 10 provides for drainage of moisture along the bottom of hot layers 18A of heat exchanger 12A upon shut-down of the aircraft. The draining of moisture from hot layer 18A provides the benefit of mitigating the risk of freezing of pooled water within heat exchanger 12A and obstruction of airflow through heat exchanger 12A due to pooled water.

Figure 2:
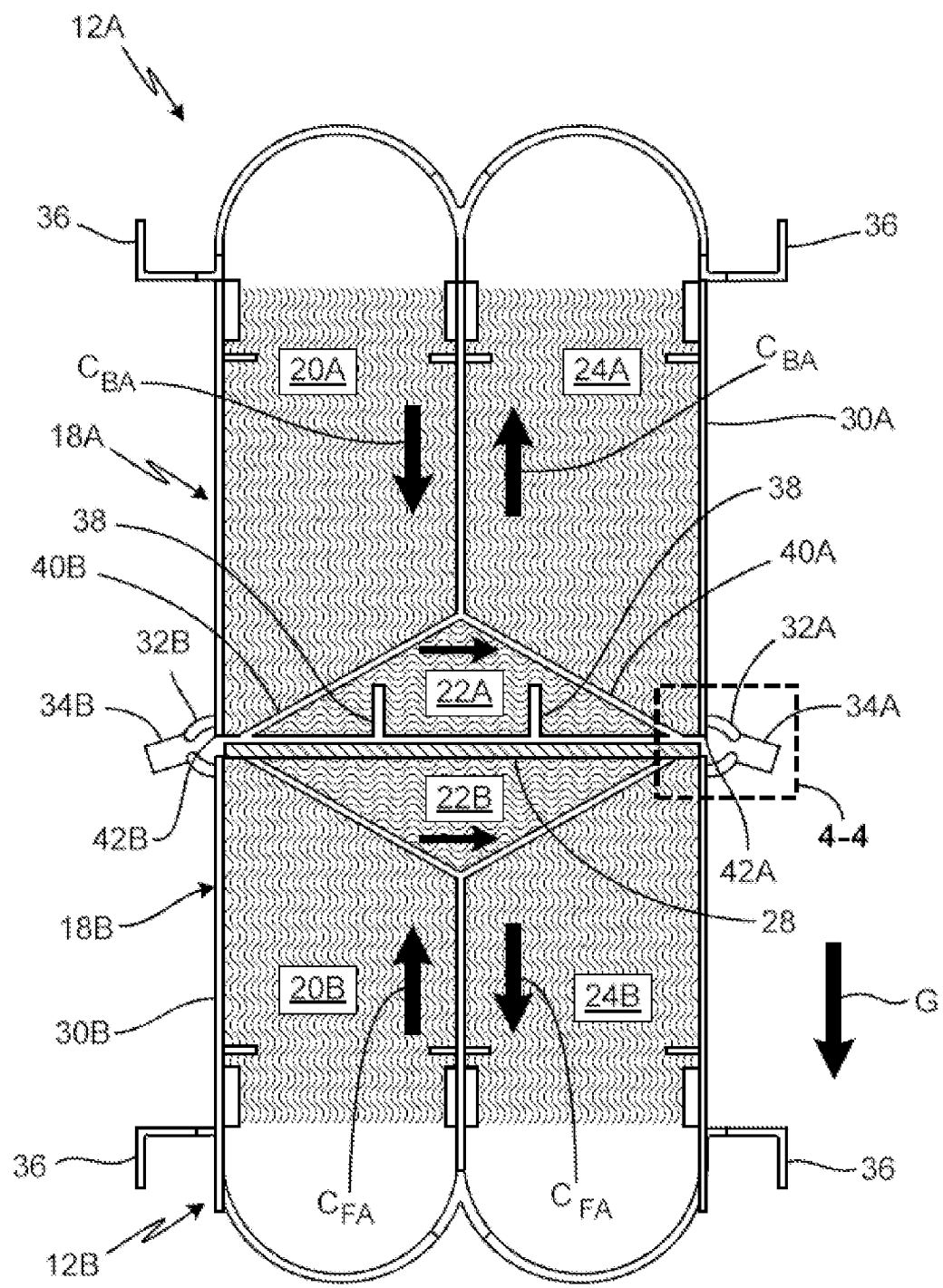
FIG. 2 is a cross-section view of a hot layer of the heat exchanger assembly taken along section plane 2-2 shown in FIG. 1.

FIG. 2 is a cross-section view of hot layers 18A and 18B of heat exchangers 12A and 12B taken along section line 2-2 shown in FIG. 1 and shows hot layer 18A (including first fin section 20A, tent fin section 22A, and second fin section 24A), hot layers 18B (including first fin section 20B, tent fin section 22B, and second fin section 24B), closure bar 28, sidewalls 30A and 30B, drain manifold 32A and 32B, spray nozzles 34A and 34B, mounting flanges 36, drain slots 38, drain slots 40A and 40B, openings 42A and 42B, gravity G, bleed air circuit $C_{BA}$, and fresh air circuit $C_{FA}$.

In this example, heat exchangers 12A and 12B are shown as including two drain manifolds, drain manifolds 32A and 32B, positioned on opposite side of heat exchangers 12A and 12B. Additionally, two nozzles are shown, spray nozzles 34A and 34B. In one non-limiting embodiment, either of spray nozzles 34A and/or 34B can have a downward slope to facilitate natural drainage and direct the water spray downwards towards heat exchanger 12B. An angle between horizontal and either of spray nozzles 34A and/or 34B can be set to achieve optimum performance. Drain slots 38 are vertical openings or channels cut into portions of the fins of tent fin section 22A. Drain slots 40A and 40B are slots or openings cut into portion of the fins of hot layer 18A. Openings 42A and 42B are holes or openings in sidewalls 30A and 30B, respectively. Gravity G is a direction of gravity and is shown in FIG. 2 as vertically downward. Depending on the configuration of the ECS that heat exchanger assembly 10 is installed into (e.g., symmetric or asymmetric heat exchanger configuration), spray nozzles 34B can be capped when drain manifold 32B is not in use to drain moisture from hot layer 18A.

For example, in a non-limiting embodiment including a symmetric ECS installation configuration, any water/moisture collected from hot layer 18A would only be sprayed into the ram inlet side (e.g., right hand side of heat exchangers 12A and 12B as shown in FIG. 2) of heat exchanger assembly 10 to achieve additional evaporative cooling within heat exchanger assembly 10. In this example, drain manifold 32B (that is downstream of drain manifold 32A) would be plugged such that any water would be directed to drain manifold 32A (that is downstream of drain manifold 32B). (See, e.g., FIG. 2). In another non-limiting embodiment, for a left-hand ECS pack installation configuration, the right-hand drain manifold plugs would be vented towards a RAM air inlet and the left-hand drain manifold plugs would not be vented. Conversely, in another non-limiting embodiment, for a right-hand ECS pack installation, the left-hand drain manifold plugs would be vented to a RAM inlet and the right-hand drain manifold plugs would not be vented.

In FIG. 2, heat exchanger 12A is shown as being positioned above heat exchanger 12B relative to a direction of gravity G. Drain slots 38 are cut into portions of tent fin section 22A of hot layer 18A and are in fluid communication with bleed air circuit $C_{BA}$. Drain slot 40A is formed at the diagonal interface between tent fin section 22A and second fin section 24A. Drain slot 40A is connected to opening 42A of sidewall 30A at a location of drain manifold 32A such that drain slot 40A is in fluid communication with a channel of drain manifold 32A. Drain slot 40B is formed at the diagonal interface between tent fin section 22A and second fin section 20A. Drain slot 40B is connected to opening 42B of sidewall 30B at a location of drain manifold 32B such that drain slot 40B is in fluid communication with a channel of drain manifold 32B. Openings 42A fluidly connects a top surface of closure bar 28 to drain manifold 32A. Opening 42A also fluidly connects drain slot 40A to drain manifold 32A. Opening 42B fluidly connects a top surface of closure bar 28 to drain manifold 32B. Opening 42B also fluidly connects drain slot 40B to drain manifold 32B.

Due to the configuration of hot layer 18A being positioned in this way relative to the direction G of gravity, moisture in bleed air circuit $C_{BA}$ accumulates and drains in a vertically downward direction from first and second fins sections 20A and 24A, down to tent fin section 22A, and further down to closure bar 28 (e.g., via drain slots 40A and 40B). Additionally, moisture from bleed air circuit $C_{BA}$ drains from the fins of second fin section 24A, into drain slot 40A, from drain slot 40A into and through opening 42A, and into drain manifold 32A. Likewise, in another non-limiting embodiment of a symmetric pack installation where the bleed and ram flows are reversed, moisture from bleed air circuit $C_{BA}$ drains from the fins of first fin section 20A, into drain slot 40B, from drain slot 40B into and through opening 42B, and into drain manifold 32B.

Figure 3:
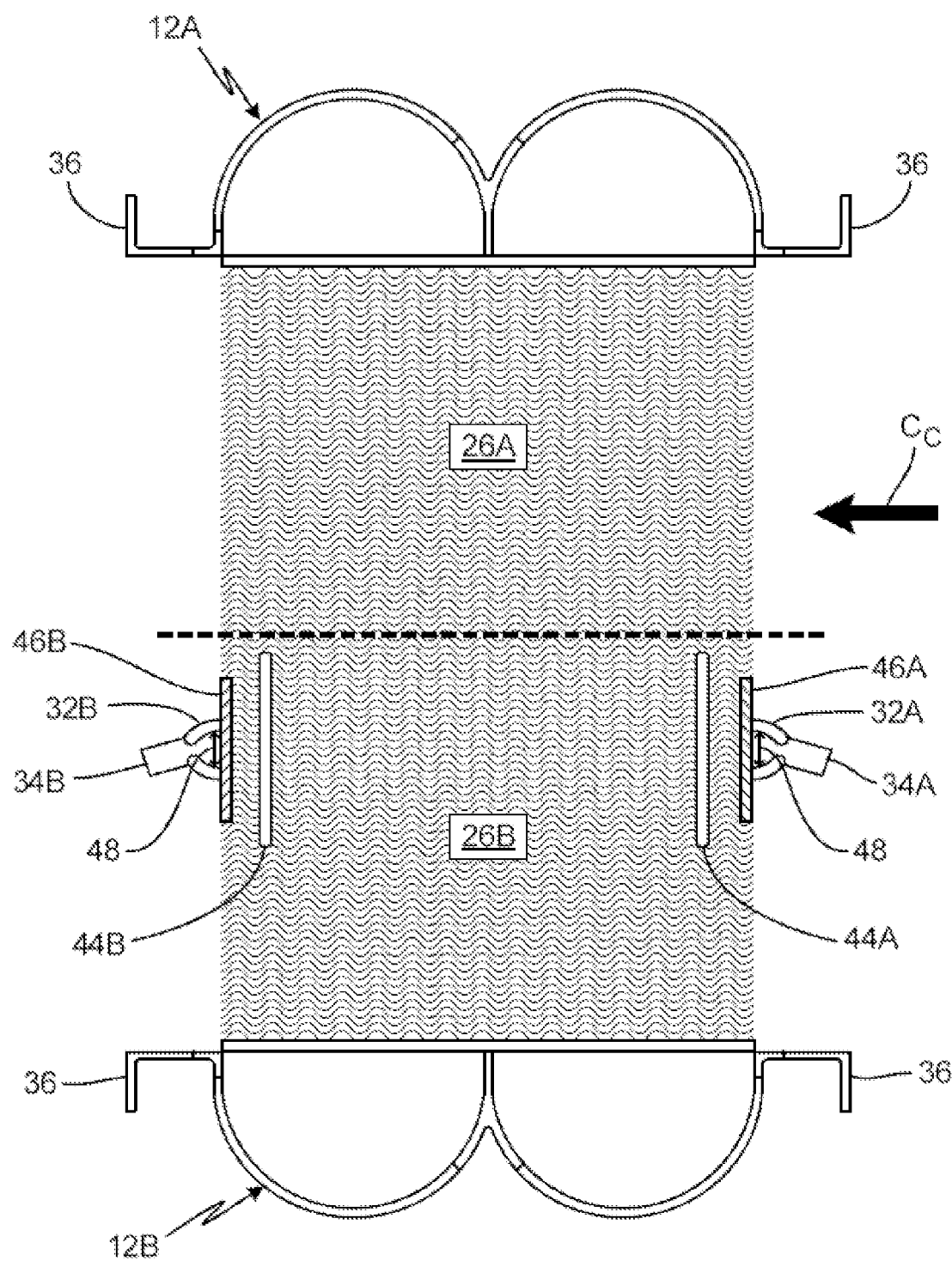
FIG. 3 is a cross-section view of a cold layer of the heat exchanger assembly taken along section plane 3-3 shown in FIG. 1.

FIG. 3 is a cross-section view of cold layers 26A and 26B of heat exchangers 12A and 12B taken along section line 3-3 shown in FIG. 1 and shows cold layers 26A and 26B, drain manifolds 32A and 32B, spray nozzles 34A and 34B, mounting flanges 36, drain slots 40A and 40B, redistribution slots 44A and 44B, closure bars 46A and 46B, and cold air circuit $C_C$.

Redistribution slots 44A and 44B are openings or channels cut into fins of cold layers 26A and 26B, respectively. Closure bars 46A and 46B are flat pieces of solid material. In this embodiment, redistribution slots 44A and 44B are cut into fins of cold layers 26A and 26B to provide fluidic passages for a fluid flow of cold air circuit $C_C$ to redistribute into another fin slot so as to move around closure bars 46A and 46B. Closure bars 46A and 46B provide a solid surface to which drain manifolds 32A and 32B can be mounted/attached (e.g., welded to).

Figure 4:
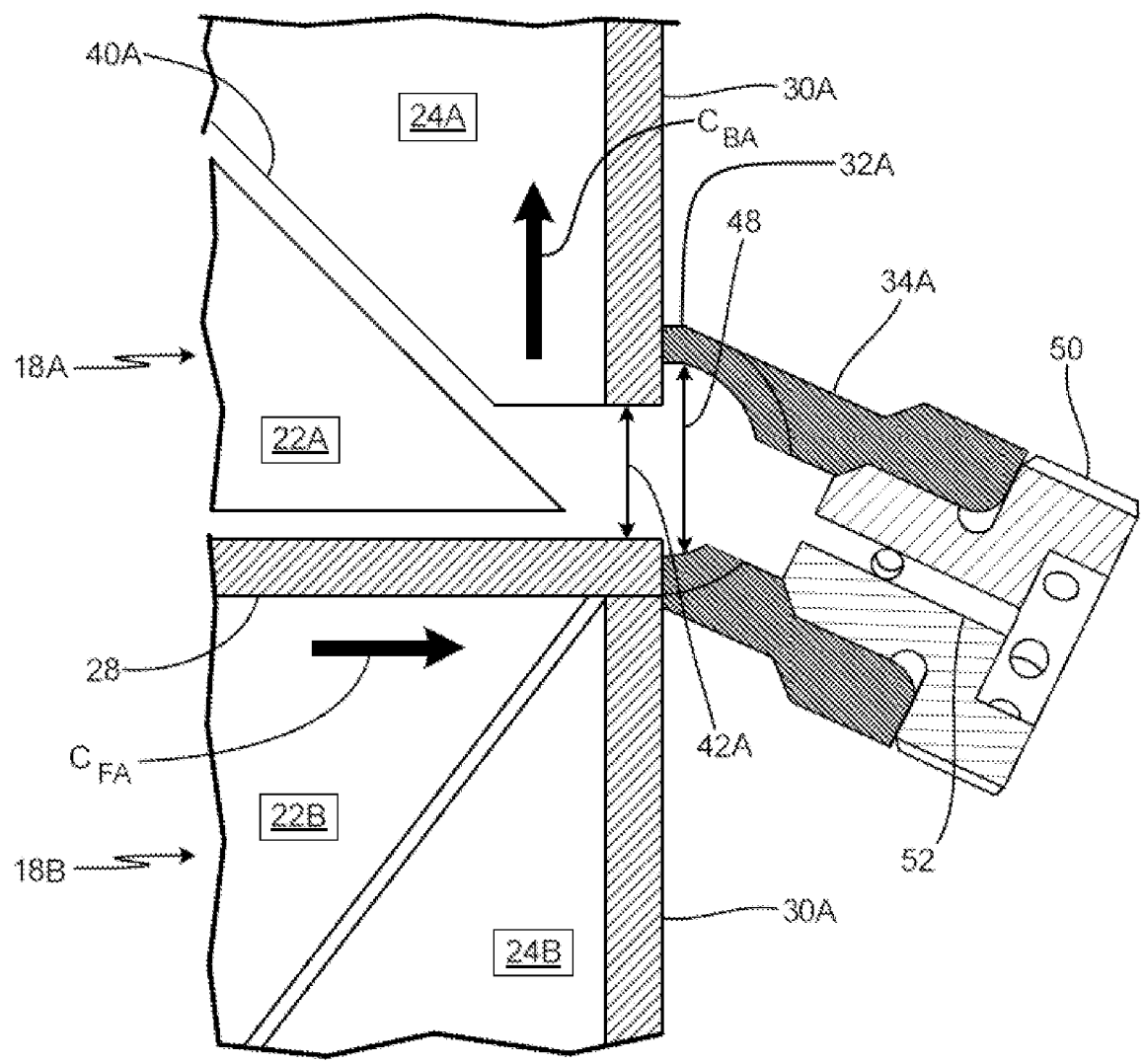
FIG. 4 is an enlarged cross-sectional view of portion 4-4 shown in FIG. 2 of the heat exchanger assembly and shows a drain manifold and a nozzle connected to the side of the heat exchanger assembly.

FIG. 4 is a cross-sectional view taken along 4-4 in FIG. 2 and shows drain manifold 32A and spray nozzle 34A connected to sidewall 30A of heat exchanger assembly 10. FIG. 4 includes hot layers 18A and 18B, tent fin section 22A, second fin section 24A, closure bar 28, sidewall 30A, drain manifold 32A (with channel 48), spray nozzle 34A (with insert 50 including flow limiting orifice 52), drain slot 40A, and opening 42A.

Channel 48 is a passage or opening extending through drain manifold 32A. Insert 50 is a plug disposed in an end of spray nozzle 34A. Flow limiting orifice 52 is a channel extending through insert 50 with a reduced diameter for restricting the fluid passing through insert 50. Here, FIG. 4 shows the relative positioning and orientations as between tent fin section 22A, second fin section 24A, closure bar 28, sidewall 30A, drain manifold 32A (with channel 48), spray nozzle 34A (with insert 50), drain slot 40A, and opening 42A. For example, spray nozzle 34A is pointed in a downwards position to assist with drainage of moisture from drain manifold 32A. Additionally, drain manifold 32A is shown as overlapping opening 42A such that a bottom portion of channel 48 is positioned below a bottom of opening 42A to encourage moisture to fall into channel 48 from openings 42A. In one example, a height of channel 48 can be sized to minimize the risk of pooling water within heat exchanger 12A.

For example, the top surface of closure bar 28 and drain slot 40A both connect to opening 42A that opens up into channel 48 of drain manifold 34A so as to drain water from both of closure bar 28 and drain slot 40A out of hot layer 18A, into drain manifold 32A, and out through spray nozzle 34A. After water is drained into channel 48 from hot layer 18A, the moisture is emitted out of drain manifold 32A through spray nozzle 34A and into cold air circuit $C_C$ to provide for additional evaporative cooling as cold air circuit $C_C$ enters into heat exchanger assembly 10.

Discussion of Possible Embodiments

The following are non-exclusive descriptions of possible embodiments of the present invention.

A heat exchanger assembly for an aircraft with an environmental control system includes first and second heat exchangers, a closure bar, and a drain manifold. The first heat exchanger is in fluid communication with a source of bleed air from the aircraft. The second heat exchanger has a second hot air circuit passing through the second heat exchanger and is disposed adjacent to and in fluid communication with the first heat exchanger. The closure bar is disposed between the first and second heat exchangers such that the closure bar prevents fluid communication across the closure bar between the first and second heat exchangers. The drain manifold is mounted to a sidewall of the heat exchanger assembly. A channel of the drain manifold is in fluid communication with a surface of the closure bar.

The assembly of the preceding paragraph can optionally include, additionally and/or alternatively, any one or more of the following features, configurations and/or additional components.

The first heat exchanger can comprise a first hot air circuit passing through the first heat exchanger and/or a plurality of hot layers, wherein each hot layer of the plurality of hot layers can comprise a first vertical fin section, a tent fin section that can be disposed downstream of and/or in fluid communication with the first vertical fin section, wherein fins of the tent fin section can be positioned perpendicular to fins of the first vertical fin section, and/or a second vertical fin section can be disposed downstream of and/or in fluid communication with the tent fin section, wherein fins of the second vertical fin section can be positioned perpendicular to fins of the tent fin section.

A drain slot can be formed at an interface between the tent fin section and the second vertical fin section, wherein the drain slot can be connected to an opening of the sidewall of the heat exchanger assembly at a location of the drain manifold such that the drain slot can be in fluid communication with the channel of the drain manifold.

A drain slot can be disposed in a portion of tent fin section of one of the hot layers, wherein the drain slot can extend to and/or is in fluid communication with a surface of the closure bar.

The drain manifold can be mounted to the sidewall of the heat exchanger assembly at a downstream end of the tent fin section.

The first heat exchanger can comprise a bleed air heat exchanger and/or wherein the second heat exchanger can comprise a fresh air heat exchanger.

A cold air circuit can passing through each of the first and second heat exchangers, wherein the first and/or second heat exchangers can be in cross-flow communication with the cold air circuit, wherein the cold air circuit can be fluidly connected to a source of ram air from the aircraft.

A spray nozzle can be mounted to the drain manifold and/or be in fluid communication with the channel of the drain manifold.

The spray nozzle can be positioned to emit moisture from the channel of the drain manifold, out of the drain manifold, and/or into a fluid flow entering into the heat exchanger assembly such that the moisture emitted from the spray nozzle can promote evaporative cooling from the fluid flow entering into the heat exchanger assembly.

The first heat exchanger can be positioned above the second heat exchanger relative to a direction of gravity.

The first and second heat exchangers can be fluidly connected in parallel.

A method of managing water in a heat exchanger assembly of an aircraft includes passing hot air of a first hot air circuit through hot layers of a first heat exchanger of a heat exchanger assembly. The heat exchanger assembly includes first and second heat exchangers, a closure bar, and a spray nozzle. The first heat exchanger is in fluid communication with a source of bleed air from the aircraft. The second heat exchanger has a second hot air circuit passing therethrough and is disposed adjacent to and in fluid communication with the first heat exchanger. The closure bar is disposed between the first and second heat exchangers such that the closure bar prevents fluid communication across the closure bar between the first and second heat exchangers. The drain manifold is mounted to a sidewall of the heat exchanger assembly. A channel of the drain manifold is in fluid communication with a surface of the closure bar. Moisture deposited onto the closure bar is drained through an opening in the sidewall of the heat exchanger assembly and into the channel of the drain manifold. The moisture is then emitted from the channel of the drain manifold out of the drain manifold through the spray nozzle.

The method of the preceding paragraph can optionally include, additionally and/or alternatively, any one or more of the following steps, features, configurations and/or additional components.

Emitting moisture from the spray nozzle can further comprise emitting the moisture into a fluid flow entering into the heat exchanger assembly that can promote evaporative cooling from the fluid flow in the heat exchanger assembly.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A heat exchanger assembly for an aircraft with an environmental control system, the heat exchanger assembly comprising:
   a first heat exchanger in fluid communication with a source of bleed air from the aircraft;
   a second heat exchanger with a second hot air circuit passing therethrough, wherein the second heat exchanger is disposed adjacent to and in fluid communication with the first heat exchanger;
   a closure bar disposed between the first and second heat exchangers, such that the closure bar prevents fluid communication across the closure bar between the first and second heat exchangers; and
   a drain manifold mounted to a sidewall of the heat exchanger assembly, wherein a channel in the drain manifold is in fluid communication with a surface of the closure bar.

2. The heat exchanger assembly of claim 1, wherein the first heat exchanger comprises:
   a first hot air circuit passing through the first heat exchanger; and
   a plurality of hot layers, wherein each hot layer of the plurality of hot layers comprises:
      a first vertical fin section;
      a tent fin section disposed downstream of and in fluid communication with the first vertical fin section, wherein fins of the tent fin section are positioned perpendicular to fins of the first vertical fin section; and
      a second vertical fin section disposed downstream of and in fluid communication with the tent fin section, wherein fins of the second vertical fin section are positioned perpendicular to fins of the tent fin section.

3. The heat exchanger assembly of claim 2, further comprising:
   a drain slot formed at an interface between the tent fin section and the second vertical fin section, wherein the drain slot is connected to an opening of the sidewall of the heat exchanger assembly at a location of the drain manifold such that the drain slot is in fluid communication with the channel of the drain manifold.

4. The heat exchanger assembly of claim 2, further comprising:
   a drain slot disposed in a portion of tent fin section of one of the hot layers, wherein the drain slot extends to and is in fluid communication with a surface of the closure bar.

5. The heat exchanger assembly of claim 2, wherein the drain manifold is mounted to the sidewall of the heat exchanger assembly at a downstream end of the tent fin section.

6. The heat exchanger assembly of claim 1, wherein the first heat exchanger comprises a bleed air heat exchanger and wherein the second heat exchanger comprises a fresh air heat exchanger.

7. The heat exchanger assembly of claim 1, further comprising a cold air circuit passing through each of the first and second heat exchangers, wherein the first and second heat exchangers are in cross-flow communication with the cold air circuit, wherein the cold air circuit is fluidly connected to a source of ram air from the aircraft.

8. The heat exchanger assembly of claim 1, further comprising a spray nozzle mounted to the drain manifold and in fluid communication with the channel of the drain manifold.

9. The heat exchanger assembly of claim 8, wherein the spray nozzle is positioned to emit moisture from the channel of the drain manifold, out of the drain manifold, and into a fluid flow entering into the heat exchanger assembly such that the moisture emitted from the spray nozzle promotes evaporative cooling from the fluid flow entering into the heat exchanger assembly.

10. The heat exchanger assembly of claim 1, wherein the first heat exchanger is positioned above the second heat exchanger relative to a direction of gravity.

11. The heat exchanger assembly of claim 1, wherein the first and second heat exchangers are fluidly connected in parallel.

12. A method of managing water in a heat exchanger assembly of an aircraft, the method comprising:
   passing hot air of a first hot air circuit through hot layers of a first heat exchanger of a heat exchanger assembly, wherein the heat exchanger assembly comprises:
      the first heat exchanger in fluid communication with a source of bleed air from the aircraft;
      a second heat exchanger with a second hot air circuit passing therethrough, wherein the second heat exchanger is disposed adjacent to and in fluid communication with the first heat exchanger;
      a closure bar disposed between the first and second heat exchangers, such that the closure bar prevents fluid communication across the closure bar between the first and second heat exchangers;
      a drain manifold mounted to a sidewall of the heat exchanger assembly, wherein a channel of the drain manifold is in fluid communication with a surface of the closure bar; and
      a spray nozzle mounted to the drain manifold and in fluid communication with the channel of the drain manifold; and
   draining moisture deposited onto the closure bar through an opening in the sidewall of the heat exchanger assembly and into the channel of the drain manifold.

13. The method of claim 12, further comprising emitting moisture from the channel of the drain manifold out of the drain manifold through the spray nozzle.

14. The method of claim 13, wherein emitting moisture from the spray nozzle further comprises emitting the moisture into a fluid flow entering into the heat exchanger assembly to promote evaporative cooling from the fluid flow in the heat exchanger assembly.

\* \* \* \* \*